219-121. SR 4-16-74 OR 3,805,015

United States Patent [19]

Herziger et al.

[11] 3,805,015

[45] Apr. 16, 1974

[54] LASER APPARATUS SUPPORTED BY AN OPTICAL BENCH

[75] Inventors: Gerd Bernd Herziger, Gumligen; Jurg Steffen, Kehrsatz, both of Switzerland

[73] Assignees: Institut fur angwandte Physik der Universitat Bern, Bern; Pierres Holding S.A., Biel, both of, Switzerland

[22] Filed: Feb. 24, 1972

[21] Appl. No.: 229,122

[30] Foreign Application Priority Data

Feb. 25, 1971 Switzerland........................ 2844/71

[52] U.S. Cl.......... 219/121 L, 331/94.5 A, 350/321

[51] Int. Cl............................................. B23k 27/00

[58] Field of Search............ 219/121 L; 331/94.5 A; 350/321

[56] References Cited

UNITED STATES PATENTS

| | | | |
|---|---|---|---|
| 3,622,739 | 11/1971 | Steffen | 219/121 L |
| 3,519,359 | 7/1970 | Berg | 219/121 L |
| 3,289,099 | 11/1966 | Masters | 219/121 L |
| 3,586,998 | 6/1971 | Gould | 331/94.5 |
| 3,634,646 | 1/1972 | Berger | 219/121 L |
| 3,524,046 | 8/1970 | Browner | 219/121 L |
| 3,325,819 | 6/1967 | Fraser | 219/121 L |
| 3,584,183 | 6/1971 | Chiaretta | 219/121 LM |

OTHER PUBLICATIONS

Manufacturing Optics International, Vol. 22, No. 3, pp. 194, Sept. 1969.

Laser Focus, Jan. 1968, pp. 8.

Ealing Optical Services Catalog, 1968, 1969, 5/68, pp. 11–13, 52–57.

*Primary Examiner*—Thomas J. Kozma
*Assistant Examiner*—George A. Montanye
*Attorney, Agent, or Firm*—Eric H. Waters

[57] ABSTRACT

Workpieces are fed in succession to a laser beam to be machined thereby, the laser beam being produced by a laser resonator oscillating in the fundamental transverse mode and incorporating a laser head with a laser rod and energizing lamp, and two spaced mirrors flanking the head and aligned therewith. The mirrors are spaced at a distance to provide an effective mirror spacing which is equal to one half of the focal length of the laser rod, the rod acting as a condenser lens at operational temperatures.

2 Claims, 4 Drawing Figures

LASER APPARATUS SUPPORTED BY AN OPTICAL BENCH

BRIEF SUMMARY OF THE INVENTION

The invention relates to an installation for automatic machining of workpieces by means of laser beams.

The installation provides the mounting in successive alignment on an optical bench of a laser resonator oscillating in the fundamental transverse mode, a beam splitting device, an optical focusing device, and a transporting device for the workpieces. The laser resonator incorporates a laser head comprising a laser rod and an energizing lamp which excites the laser rod, the lamp being fed from a power supply unit with electric pulses which are triggered by the transporting device for the workpieces and controlled by a control device to which a measuring beam is supplied from the beam-splitting device, the magnitude of the measuring beam being proportional to that of the effective beam. In order to achieve high uniformity of successive laser beam pulses and, consequently, of the produced workpieces, the effective distance between spaced mirrors of the resonator is chosen in accordance with the invention so as to amount to approximately one half of the focal length $f$ of the laser rod which behaves as a condenser lens at operational temperatures.

In order to avoid interference with the uniformity of the laser beam pulses and thereby the machining operations, by mechanical vibrations which would greatly impair the prospect of achieving and maintaining the fundamental mode oscillations, it is preferred to utilize a resonator with a relatively high geometric length and corresponding effective distance between the mirrors of, for instance, approximately 3 m, on a substantially vibration-free optical bench, or to utilize a geometrically short resonator with a large effective distance between the spaced mirrors.

DETAILED DESCRIPTION

Figure 1:
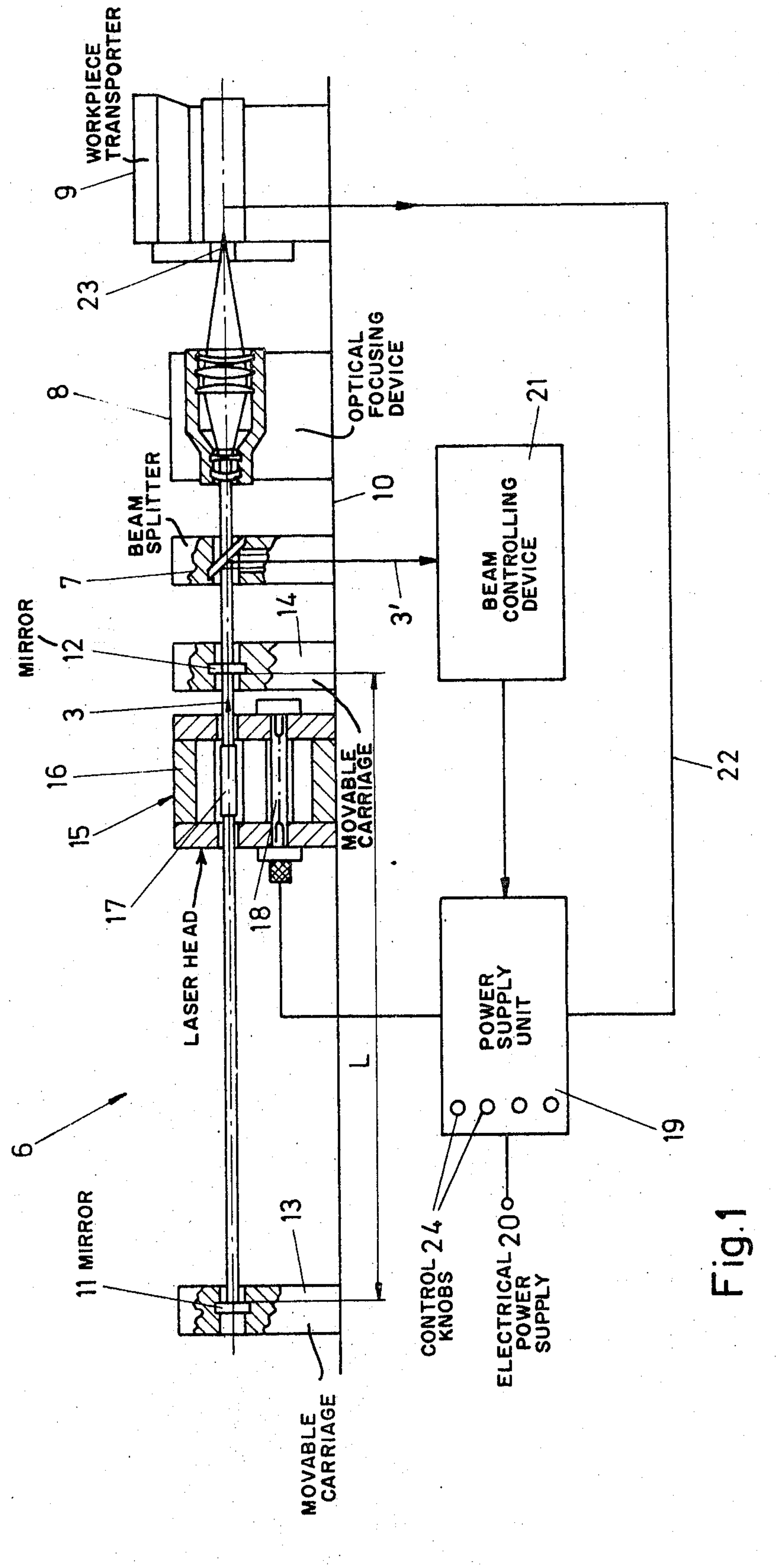
FIG. 1 is a schematic view of an automatic laser-beam drilling device.

In the installation in FIG. 1, laser-beam pulses are produced which are used for drilling workpieces, such as, jewels for watches, wherein, after the drilling operation has been finished on one watch jewel, another jewel is automatically advanced by a conventional means to the drilling position, and thereby triggers a new pulse.

The installation comprises a laser resonator 6, a beam-splitting device 7, an optical focusing device 8 and a transporting device 9 for the workpieces, successively mounted in alignment on an optical bench 10. The resonator 6 comprises two mirrors 11 and 12, which are spaced apart by a distance $L$. In the disclosed embodiment in FIG. 1, there is contemplated a long resonator, wherein the length $L$ is approximately 3 m. The length $L$ is adjustable by mounting both mirrors 11 and 12 on carriages 13 and 14, each of which is separately displaceable and fixable on the optical bench 10. A laser head 15 is mounted on the optical bench 10 between the mirrors 11 and 12. In proximity to the decoupling mirror 12 from which the the effective laser beam 3 is emitted, the housing 16 of the laser head 15 contains a laser rod 17 made, for instance, of neodymium-doped yttrium-aluminum-garnet (YAG), and a flash-light lamp 18. The housing 16, whose inner surface is provided with a mirror coating, has an elliptical cross-section, and the laser rod 16 and the flash-light lamp 18 are located at the focal points of the cross-section, so that the pumping light beams emanating from the lamp 18 are concentrated in the rod 17 in order to bring about the inversion of the electron occupation of the questionable level of energy which is necessary for achievement of the laser effect. The flash-light lamp 18 is energized by means of a power supply unit 19, which is connected to the electric supply means 20, as shown schematically with only one supply line illustrated. The flash-light lamp 18 and the laser rod 17 are surrounded by glass tubes (not shown) through which cooling water is circulated.

The power supply unit 19 is connected to the output of a beam-controlling device 21 and to a signal line 22 originating in the transporting device 9 for the workpieces. The power supply unit is provided in a conventional manner with a main capacitor which is charged to an adjustable voltage via control system, and which is discharged at the arrival of a signal which indicates that a watch jewel has been advanced to the operative or drilling position at 23 in the transporting device. As a result, the flash-light lamp 18 is fed through a time-delay L—C chain consisting of a plurality of inductances and capacitances. However, before the manufacturing process has been started, the discharge triggering pulses can be fed to the power-supply unit 19 through the transmission line 22 from the pulse generator provided in the transporting device 9, without a watch jewel to be drilled being brought into the drilling position 23.

The beam-controlling device 21, to which a small fraction 3′ of the beam 3 is fed by means of the beam-splitting device 7, comprises, a cathode beam oscilloscope in order that the shape of the laser beam pulse can be viewed on the picture tube of the oscilloscope. When the operator of the laser device establishes from the oscilloscope tube that the laser beam pulses, which are triggered by the above mentioned pulse generator, have the desired shape, particularly, that the peaks and the intervals correspond to experimentally determined requirements, the transporting device 9 is switched from "a control" mode to a "transporting" mode and the automatic drilling process is commenced. The control device 21 also transmits control pulses to the power supply unit 19 in order to keep the energy of the laser pulses constant.

If the shape of the peaks of the pulses, does not comply with requirements, then the shape of the flash-light pulses, especially their duration, maximum intensity and the slope steepness, can be changed by actuating adjustment knobs 24 of the power supply unit 19, in order to regulate the development of the peaks. The knobs 24 control the magnitude of the charging voltage of the main capacitor, as well as the values of inductances and capacitances of the single members of the L—C-time delay chain. It is necessary to wait from a certain number of pulses before the actual drilling process is started in order to allow the laser rod 17 and the flash-light lamp 18, which are initially at ambient temperature when the power supply device 19 is first switched on, to reach a uniform operational temperature.

Figure 2:
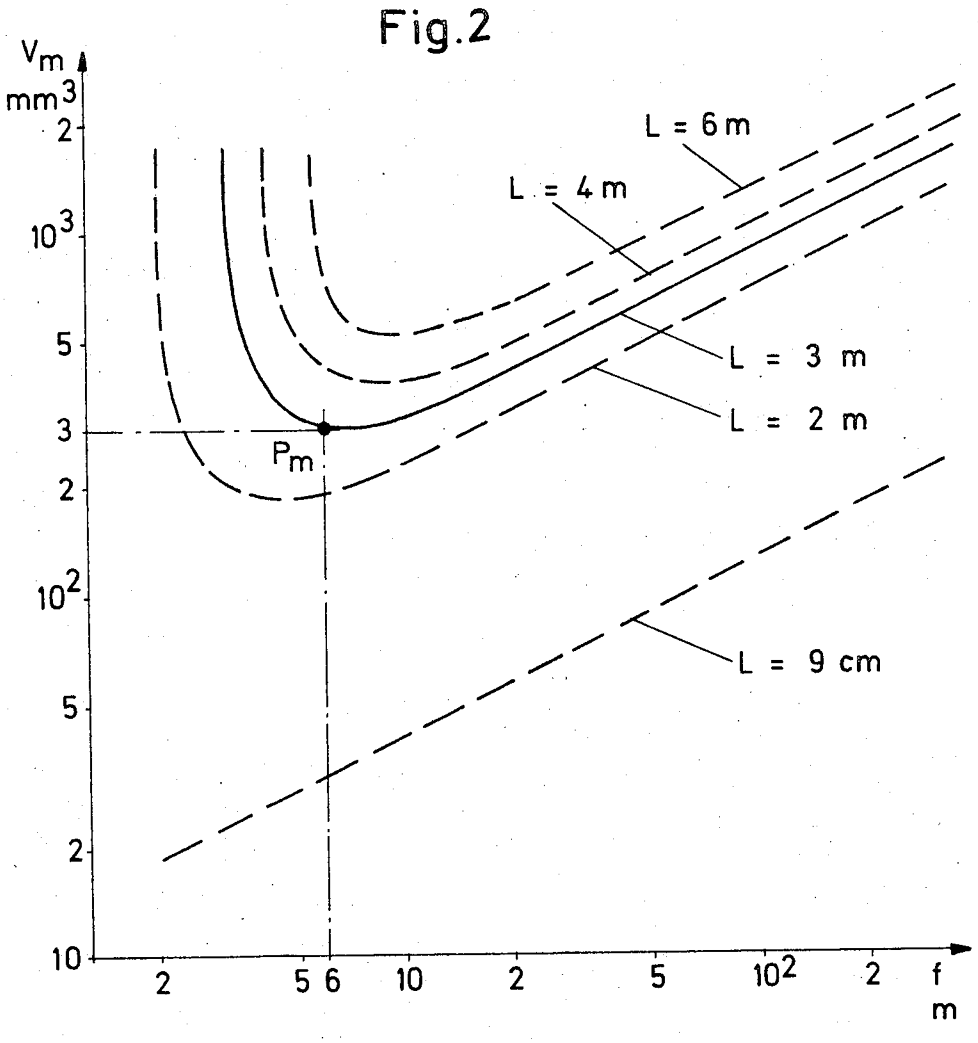
FIG. 2 is a graphical illustration for explanation of the mode of operation of the resonator of the installation in FIG. 1.

In order to produce a cylindrical, drilling hole which is perfectly circular, it is of significant importance that the resonator 6 oscillates only in the fundamental transverse mode, and that the effective beam 3 has a substantially cylindrical shape, after it has been focused by the optical device 8, and a very small diameter which is slightly smaller than the diameter of the desired size of the drilling hole. As already shown in Swiss Application No. 2,968,169, U.S. Pat. No. 3,622,739 it can be achieved with this resonator having a total length of several meters and planar parallel mirrors, that a great part of the volume of the laser rod 17 participates in the process of excitation or maintaining the fundamental transverse mode, and that the oscillations occur in transverse fundamental mode exclusively. The above mentioned part of the volume, the so-called "active mode volume" $V_m$ of the laser rod 17 is illustrated in FIG. 2 as a function of the focal length f of the laser rod. For a resonator length of $L = 3$m the illustration is in solid line, and for lengths $L = 6$m, 4m, 2 m and 9 cm illustration is in dashed lines. The focal length $f$ of the laser rod itself depends on the temperature of the laser rod. The rod in question is a YAG rod, having a length of 5 cm and a diameter 0.6 cm, and $V_m$ is given in $mm^3$. The laser rod warms up during the operation thereof, and a radial temperature gradient is produced as a result of the necessary cooling, which results in a convex curvature of its end surfaces, which in itself results in a lens effect. The focal length $f$ of the laser rod is given in meters, and a logarithmic scale is used on both coordinate axes. Generally, the focal length $f$ is determined by the flash-light output which is necessary for production of the laser pulses required for the drilling operations, and it amounts to approximately $f \sim 6$ m.

The greater the active mode volume $V_m$, the better the efficiency of the laser resonator for the production of the laser beam in the transverse fundamental mode. In spite of this, it is advantageous, mainly in view of the shape of the reproducible pulses of the desired kind, to maintain the length of the resonator tube to $L = ½ f$, since the $V_m$ curve has its minimum in the point $P_m$ for $L = 3$m. The reason for this is that the temperature changes in the laser rod, which cannot be avoided, and which result in variation of the focal length of $f$ have the least influence on the size and shape of the mode volume $V_m$, and, consequently, on the energy and shape of the laser beam pulses.

One reason for the temperature variations of the laser rod can readily be seen by reason of the fact that the transporting device 9 does not use exactly the same period of time for every consecutive transportation of the workpiece in the drilling position, so that flash-light discharges do not occur in exactly the same time intervals from each other. Even if the energy of the single discharges remains exactly constant, the power output accepted by the laser rod is not constant as a result of the above, which necessarily results in a temperature change, and, consequently, a change in the focal length of the laser rod 17.

The parameter $L$ can be changed by mutual displacement of the mirrors in order to adjust the working point $P_m$.

As can be seen in FIG. 2, the advantageous working point $P_m$ in the present resonator 6 is located at a mode volume ($V_m$) amounting to $3 \times 10^2$ $mm^3$, i.e., 10 times higher than in conventional short resonators ( $L$ =9cm).

In order to obtain a series of equi-shaped pulses, it is very important to avoid vibrations of the laser resonator and of its components. If vibrations occur, the consecutive pulses vary substantially, so that it cannot be concluded after observation of a pulse which is suitable for the drilling operation that the following pulse will also be suitable for this purpose. Herein, the longer the resonator, the more sensitive it is to vibrations. The vibrations can be caused on the one hand by the discharge currents feeding the flash-light lamp 18, and, on the other hand, by the transportation device 9 for the workpieces, in which non-uniform mechanical driving and inertial forces will inherently occur. If a conventional optical bench is used (a steel rail) uniform laser beam pulses are not obtained.

Figure 3:
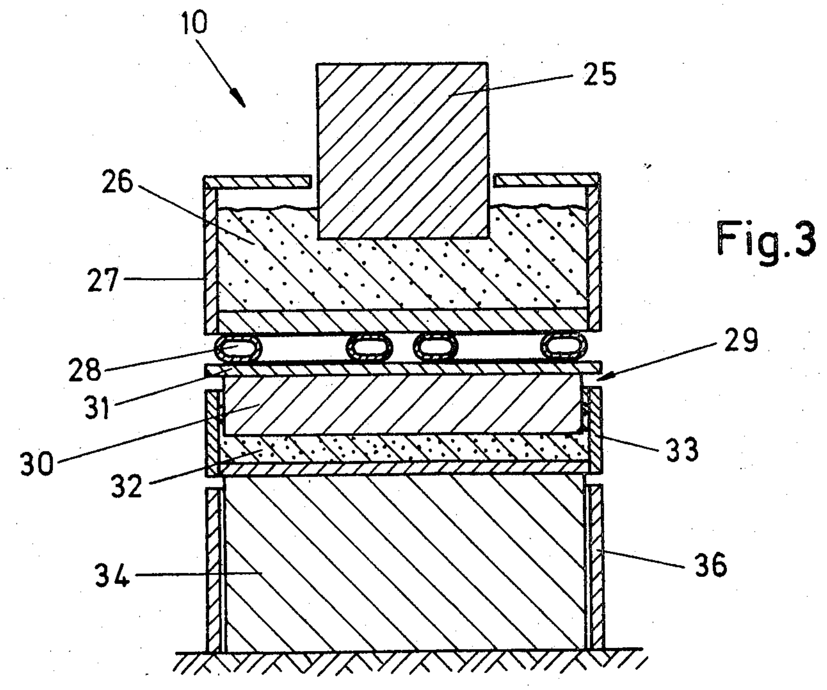
FIG. 3 is a cross-sectional view of the support of the installation in FIG. 1.

The optical bench 10 is illustrated in detail in FIG. 3 and comprises a massive longitudinal beam 25 made of natural stone, for example, serpentine and having a square cross-section of, for example, 900 $cm^2$, and a length, for example of 5 m. A high damping constant of the material of the beam is very important, fpr instance, $\delta > 0.1$. The beam could also have a cross section of at least 500 $CM^2$ and a damping coefficient $\delta$ of at least 0.1. The beam 25 is supported in a first sand bed 26, which is contained in a first container 27 of wood or the like. The support of the beam in sand prevents the beam from being subject to transverse oscillations resulting from and created by, the disturbance-creating elements attached to the beam. The container 27 rests on flexible tubes 28 containing pressurized air whose pressure can be varied in order to change the damping frequency. The tubes 28 are supported on an intermediate support 29. The intermediate support 29 comprises a body 30, made of a foamed synthetic material, for instance, Wannerit which is covered at the top surface by a plate 31 of wood. The intermediate support 29 rests upon a second sand bed 32, which is contained in a second box 33 of wood. Box 33 rests on a base 34 made of Wannerit. The base 34 rests on the floor 35, and is laterally covered on the sides by plates 36 which are not in contact with the base 34.

The optical bench 10 prevents the resonator 6, to a high degree, from being subject to any vibrations transmitted through the beam, so that very uniform pulses are obtained. The optical bench 10 can also be provided with a divided beam 25 made of natural stone, for instance, with a beam segment of a length of approximately 3 m for the resonator and a beam segment having a length of approximately 2 m for the devices 7 to 9. The division can be provided in any other suitable manner.

Figure 4:
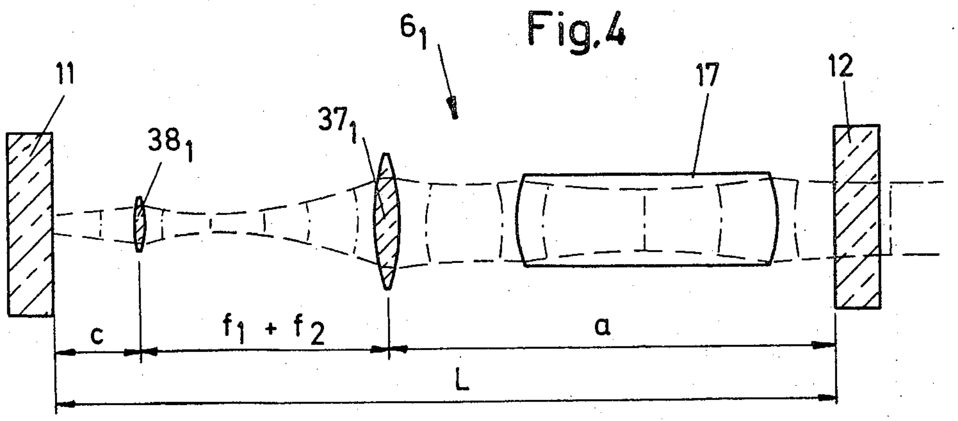
FIG. 4 is a diagrammatic illustration of another embodiment of a resonator.

FIG. 4 shows a laser resonator $6_1$ which can be used in the installation according to FIG. 1 instead of the resonator 6. In resonator $6_1$ the geometrical spacing L of the mirrors 11 and 12 is substantially less than 3 m, so that the sensitivity to vibrations of this resonator is substantially less than the resonator 6. A telescopic system consisting of two condenser lenses $37_1$ and $38_1$ is located between the laser rod 17 and the mirror 11. Alternatively, one dispersing and one condensing lens could be provided (Galilei telescope instead of Keppler telescope). It can be shown that the resonator $6_1$ behaves in the same manner in respect to the active mode volume $V_m$ as the resonator 6, the resonator $6_1$ having a length amounting to $L' = c(f_1/f_2)^2 - f_1^2/f_2 - f_1 + a$. The length $L'$ will be referred to hereafter as the "optical length" of the resonator $6_1$ (as if only the laser rod 17 is located between the planar parallel mirrors 11 and 12). The focal length $f_1$ of the lens $37_1$ can be, for instance, 10 cm, the focal length $f_2$ of the lens $38_1$, for instance, 2 cm, the distance $c$ of the lens $38_1$ from the mirror 11, for instance, 13.2 cm and the distance $a$ of the lens $37_1$ from the mirror 12, for instance, 30 cm. The geometric length $L = c + f_2 + f_1 + a$ of the resonator $6_1$, consequently, amounts to only 55.2 cm, but the optical length $L'$ is 3 m. The optical length $L'$ is preferably at least 5 times greater than the geometric length.

The relations explained with reference to FIG. 2 are also valid for the resonator $6_1$, when $L'$ is used instead of $L$. It is particularly advantageous, if the working point is chosen so that $L' = ½ f$, wherein $f$ again depends on the temperature of the laser rod 17 and the pumping source output, while the distance $c$ can be changed in order to vary the optical length $L'$. The front surfaces of the laser rod 17 are shown in FIG. 4 to be convex, i.e., in the heated condition, in order to illustrate the effect of the laser rod as a condenser lens having a focal length $f$. Furthermore, the boundaries of the laser beam are illustrated in dashed lines, which also limit the active mode volume in the inside of the laser rod 17.

It is advantageous if the resonators 6 and $6_1$ are constructed in such a manner that the effective beam is emitted through the mirror 12 in whose proximity the rod 17 is located, and not through the mirror 11 which is located at a greater distance form the rod 17. Namely thorough experiments and research have shown that the divergence of the effective laser beam is diminished in this manner, and as the mode volume $V_m$ is non-critical in respect of variations of the focal length $f$ of the laser rod.

What is claimed is:

1. Apparatus for machining workpieces by means of a laser beam comprising a laser resonator including two mirrors producing a laser beam oscillating in the transverse fundamental mode, a beam-splitting measuring device including a partially reflecting mirror reflecting a portion of the laser beam, to the laser beam in the direction a lens system positioned for focussing the laser beam onto a workpiece, means for positioning the workpiece at the focus of the lens system, an optical bench supporting said laser resonator, said beam splitting mirror, said lens system and said workpiece positioning means in successive optical alignment, said laser resonator further including a laser head comprising a laser rod and a flash lamp positioned for exciting the laser rod, a power supply connected to the flash lamp to produce electrical discharge pulses in the flash lamp, said optical bench comprising a massive beam of natural stone, a sand bed supporting said beam, and support means for said sand bed including blocks of foam material and resilient pressurized tubes between the sand bed and the block for preventing the transfer to the resonator mirrors of mechanical distortion produced either on the optical bench itself or by external vibrations, said laser resonator having an optical mirror spacing which is equal to approximately one half of the focal length of the laser rod acting as a condenser lens during operation, to obtain a constant laser beam output independent of short-time distortions, said laser resonator comprising two plane mirrors and a telescopic system disposed between said mirrors and comprising two lenses with respective focal lengths $f_1$ and $f_2$, said lenses being spaced from each other by the sum of said focal lengths, said laser rod being disposed between one of said lenses and one of said mirrors serving as an output mirror and being at a smaller distance from said output mirror than from the other mirror, said optical mirror spacing $L'$ being given by the following formula: $L' = c(f_1/f_2)^2 - f_1^2/f_2 - f_1 + a$
wherein $a$ is the distance between said one lens and said output mirror, $c$ is the distance between the other lens and the other mirror and the focal length $f_1$ of said one lens is greater than the focal length $f_2$ of the other lens.

2. Apparatus as claimed in claim 1 wherein said stone beam has a cross-section of at least 500 $cm^2$ and a damping coefficient $\delta$ of at least 0.1.

* * * * *